(12) United States Patent
Kobayashi et al.

(10) Patent No.: US 7,686,457 B2
(45) Date of Patent: Mar. 30, 2010

(54) PROJECTION IMAGE DISPLAY APPARATUS AND MULTI-PROJECTION SYSTEM

(75) Inventors: Shuichi Kobayashi, Yokohama (JP); Daisuke Ogawa, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 732 days.

(21) Appl. No.: 11/531,068

(22) Filed: Sep. 12, 2006

(65) Prior Publication Data

US 2007/0058140 A1      Mar. 15, 2007

(30) Foreign Application Priority Data

Sep. 13, 2005   (JP)   .............. 2005-265867

(51) Int. Cl.
G03B 21/26   (2006.01)
(52) U.S. Cl. .......................... 353/94; 353/30
(58) Field of Classification Search .............. 353/30, 353/94, 85; 348/745, 806
See application file for complete search history.

(56) References Cited

U.S. PATENT DOCUMENTS 6,814,448 B2 *  11/2004  Ioka ........................ 353/69

7,252,387 B2 *  8/2007  Raskar et al. ............... 353/69
2008/0259223 A1 * 10/2008 Read et al. .................. 348/745

FOREIGN PATENT DOCUMENTS

| JP | 2004-228824 | 8/2004 |
|---|---|---|
| JP | 2005-39849 | 2/2005 |

* cited by examiner

Primary Examiner—Georgia Y Epps
Assistant Examiner—Jerry Brooks
(74) Attorney, Agent, or Firm—Rossi, Kimms & McDowell LLP (57) ABSTRACT

A projection image display apparatus is disclosed which enable users to observe an image in an overlap area well. The apparatus comprises a first projector which projects a first image onto a projection surface, a projection area detector which acquires a projection area onto which a second projector projects a second image in a certain area of the projection surface. Further, the apparatus comprises a projection area controller which controls a projection area onto which the firs projector projects the first image, based on an input signal from the projection area detector.

10 Claims, 11 Drawing Sheets

PROJECTION IMAGE DISPLAY APPARATUS AND MULTI-PROJECTION SYSTEM

BACKGROUND OF THE INVENTION

The present invention relates to projection image display apparatuses suitable for projection of images onto a projection surface using a single or plural projectors and multi-projection systems.

Multi-projection systems (image display system) are conventionally used, which project plural images onto a projection surface by combination of plural projectors.

Of the systems, one is known which displays a magnified image by arranging plural image display areas onto which the plural projectors project images in a tiled manner (see Japanese Patent Laid-Open Application No. 2005-39849).

As another image display system, a so-called stack projection system is known in which plural projectors are combined and plural image areas of the respective projectors are overlapped with each other (see Japanese Patent Laid-Open Application No. 2004-228824).

The multi-projection system disclosed in FIG. 1 of Japanese Patent Laid-Open Application No. 2005-39849 divides input image information into plural pieces and displays the pieces of information by the plural projectors that constitute the system. This system displays a smooth image that is a mostly seamless image on a screen.

The stack projection system disclosed in FIG. 1 of Japanese Patent Laid-Open Application No. 2004-228824 overlaps the projection display areas of the respective projectors with high accuracy. This system can obtain a bright projection image by causing the respective projectors to display the same image information.

However, in a case where the respective projectors display images different from each other in the multi-projection system, the stack projection system disclosed in Japanese Patent Laid-Open Application No. 2004-228824 overlaps the different images. This results in making it hard to recognize the projection image.

The multi-projection system disclosed in Japanese Patent Laid-Open Application No. 2005-39849 can display the respective images independently since the respective projection areas are different from each other. However, since the projection areas are fixed, their positions cannot be moved freely.

Further, when a single projector projects an image onto the projection surface, the image and another image projected by another projector may overlap with each other.

Furthermore, when the plural projectors project plural images onto the screen, the projection areas of the images may overlap with each other thereon.

BRIEF SUMMARY OF THE INVENTION

One object of the present invention is to provide a projection image display apparatus and a multi-projection system which enable users to observe an image in an overlap area well in the above-described cases.

According to one aspect, the present invention provides a projection image display apparatus comprising a first projector which projects an image onto a projection surface, a projection area detector which acquires a projection area onto which a second projector projects an image in a certain area of the projection surface, and a projection area controller which controls a projection area onto which the firs projector projects the image, based on an input signal from the projection area detector.

According to another aspect, the present invention provides a multi-projection system comprising first and second projectors which project images on a projection surface, a projection area detector which acquires at least one of first and second projection areas onto which the images are respectively projected by the first and second projectors, and a projection area controller which controls at least one of the first and second projection areas, based on the detection result by the projection area detector.

Other objects and further features of the present invention will become readily apparent from the following description of the preferred embodiments with reference to accompanying drawings.

DETAILED DESCRIPTION OF THE PREFERRED EMBODIMENTS

A description will now be given of the preferred embodiments of the present invention by referring to the accompanying drawings.

Embodiment 1

Figure 1:
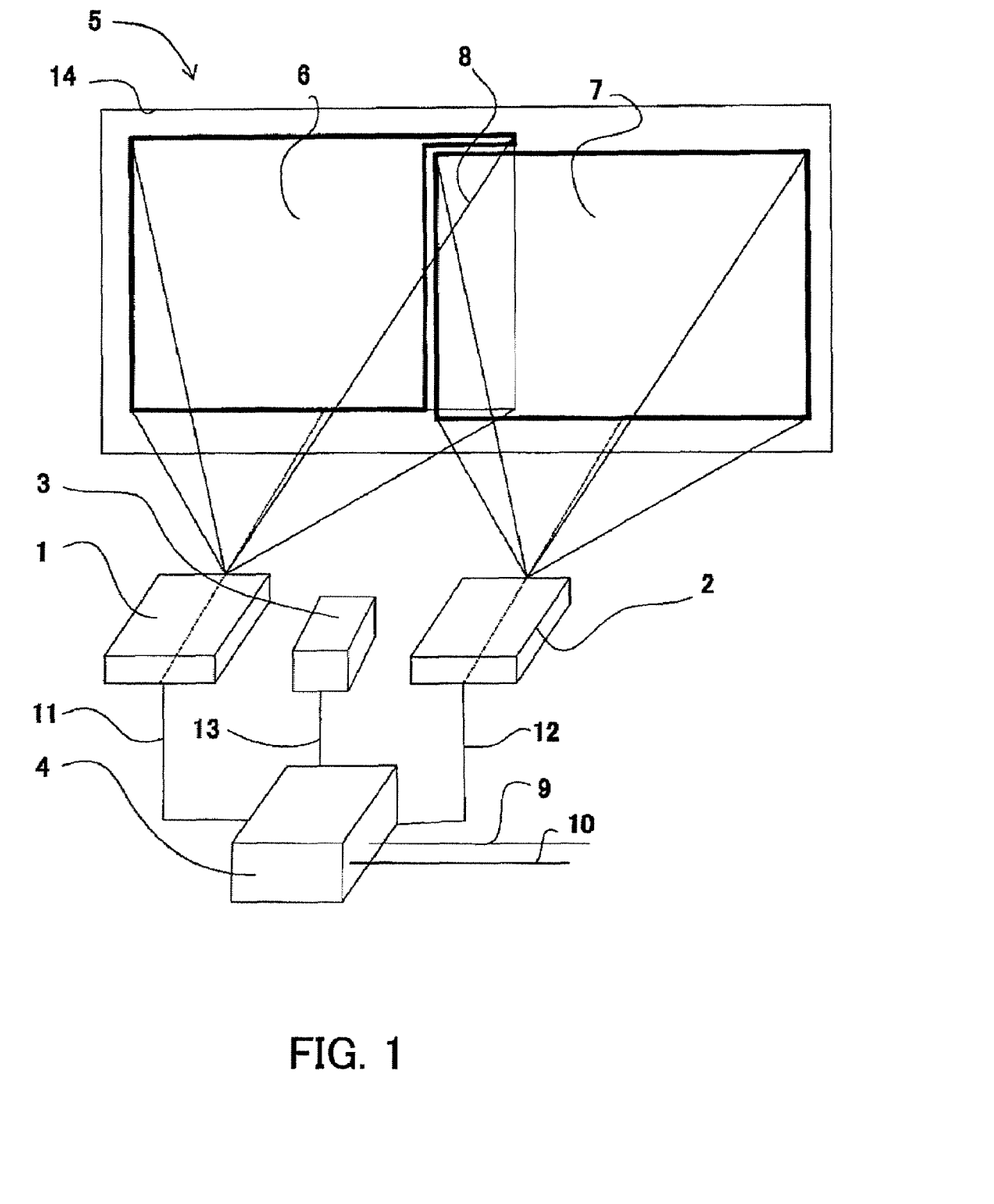
FIG. 1 is an outline view showing the configuration of the multi-projection system that is Embodiment 1 of the present invention.

FIG. 1 is an outline view showing the configuration of the main part of the multi-projection system that is Embodiment 1 of the present invention.

A first projector 1 and a second projector 2 respectively project images (video images) onto projection areas 6 and 7 of a screen (projection surface) 5. Video input signals 9 and 10 are signals based on images to be displayed by the projectors 1 and 2.

The projection areas 6 and 7 corresponding to the projectors 1 and 2 form an overlap area 8. Therefore, when the projectors 1 and 2 project the images based on the video input signals 9 and 10 onto the screen 5, the images overlap with each other in the overlap area 8, resulting in making it hard to recognize the images.

The video input signals 9 and 10 are input to a projection area controller 4 and converted into video input signals 11 and 12 whose projection areas are controlled by the controller 4. The video input signals 11 and 12 are input to the projectors 1 and 2.

The projection area controller 4 is connected to a projection area detector 3 through a signal line 13. The projection area detector 3 detects the dimensions, shape and the like of the projection areas 6 and 7 projected by the projectors 1 and 2 in a detection area 14 on the screen 5.

The projection area controller 4 restricts the projection areas 6 and 7 formed by the projectors 1 and 2 based on the detection result of the projection areas 6 and 7 detected by the projection area detector 3. Specifically, the projection area controller 4 generates from the video input signals 9 and 10 the area-controlled video input signals 11 and 12, and controls the projection areas 6 and 7 of the projectors 1 and 2 based on these video input signals 11 and 12.

For instance, the projection area controller 4 deletes the projection area of one of the projectors 1 and 2 in the overlap area 8.

The embodiment has at least the first and second projectors 1 and 2 which project video images onto the screen (projection surface) 5.

An image display area in the projection area of one of the first and second projection areas 6 and 7 respectively formed by the first and second projectors 1 and 2 in the projection surface 5 is detected by the projection area detector 3. In addition, at least one of the image display areas formed in the first and second projection areas 6 and 7 is controlled by the projection area controller 4 based on the detection result by the projection area detector 3.

For instance, the projected image by the first projector 1 in the overlap area 8 is deleted.

In this embodiment, the projection area detector 3 especially detects the projected image in the area 8 in which the first projection area 6 formed by the first projector 1 overlaps with the second projection area 7 formed by the second projector 2 to input the detection result to the projection area controller 4. The projection area controller 4 controls the first projection area 6 of the first projector 1 based on the signal (detection result) input from the projection area detector 3. For instance, the projection area controller 4 deletes the projection image.

Figure 2A:
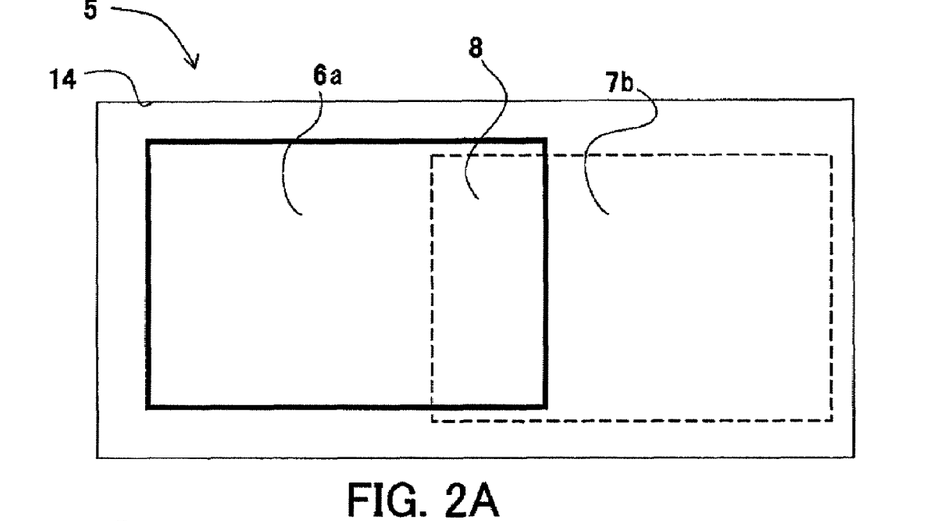
FIGS. 2A, 2B, 3A and 3B are schematic views of projection images in FIG. 1.
Figure 2B:
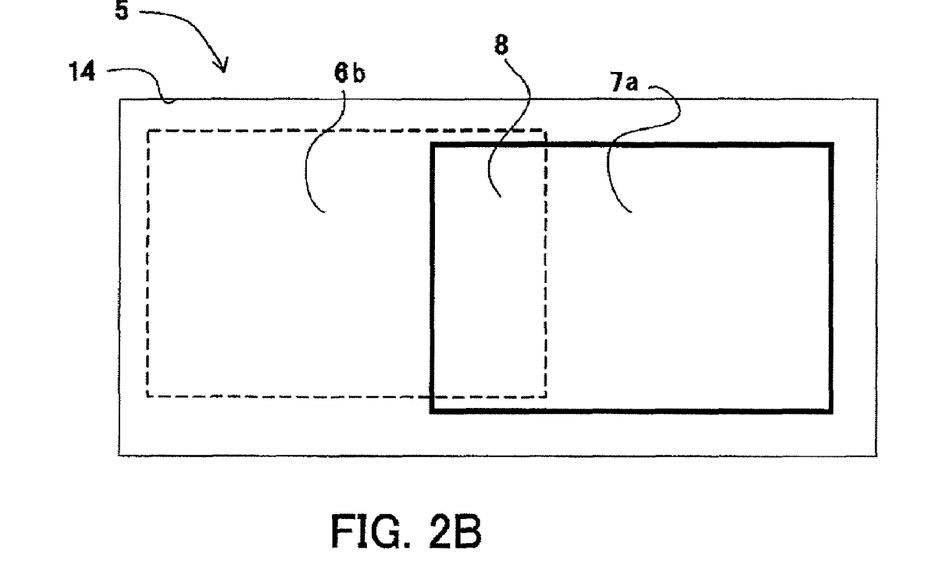

The specific method for detecting the projection areas 6 and 7 and controlling thereof will hereinafter be described. FIGS. 2A and 2B schematically show the relationship between the detection area 14 and the projection areas 6 and 7 on the screen 5.

The projection areas 6 and 7 form the overlap area 8. First, as shown in FIG. 2A, the first and second projectors 1 and 2 respectively display a fully white image 6a and a fully black image 7b on the screen 5 based on the signals from the projection area controller 4 (not shown in FIG. 2A).

In this state, the projection area detector 3 detects the projection areas. The projection area detector 3 has a function to pick up a two-dimensional image, picking up an image that shows a display state on the detection area 14.

It is possible to recognize the projection area 6a of the first projector 1 based on the resulting picked-up image.

Next, as shown in FIG. 2B, the second and first projectors 2 and 1 respectively display a fully white image 7a and a fully black image 6b on the screen 5 based on the signals from the projection area controller 4.

In this state, the projection area detector 3 detects the projection areas. It is possible to recognize the projection area 7a of the second projector 2 in the detection area 14 based on the resulting picked-up image.

Thereby, information on dimensions, position, shape and the like of each of the projection areas 6a and 7a are acquired.

Figure 3A:
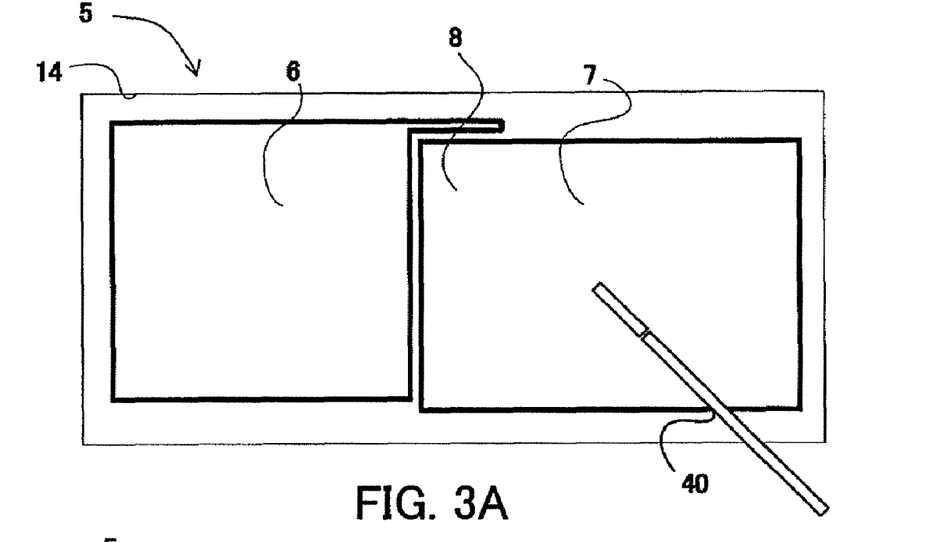
Figure 3B:
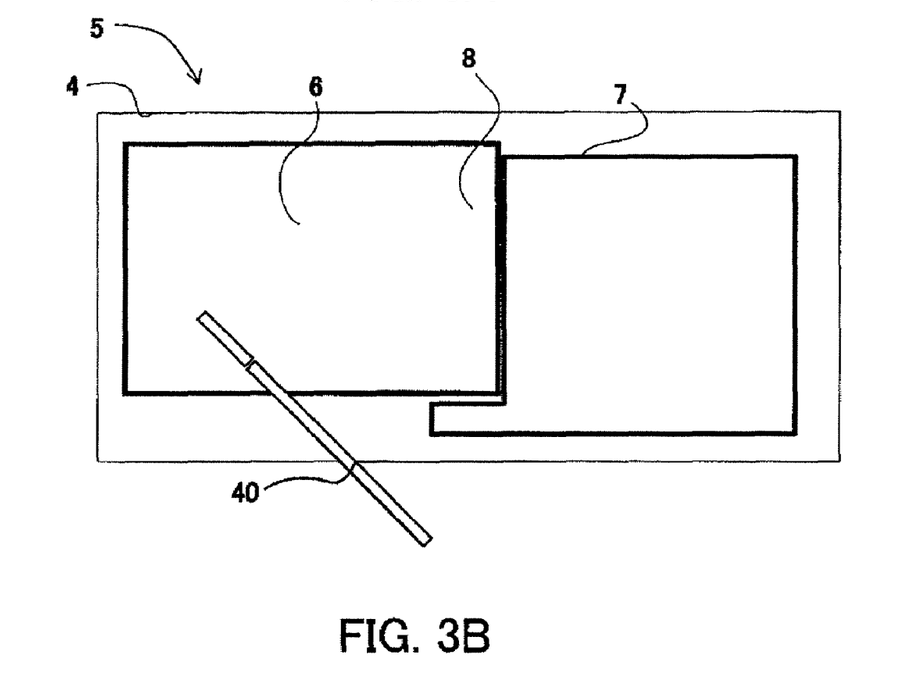

FIGS. 3A and B are explanatory figures showing the control of the projection areas 6 and 7, schematically showing each area on the screen 5 as FIGS. 2A and 2B.

When a system user, not shown, indicates the projection area 7 of the second projector 2 or the projecting area 6 of the first projector 1 by using an area indicating means 40 as shown in FIGS. 3A and 3B, an image projected by the projector whose projection area is indicated in the overlap area 8. The position indicated by the area indicating means 40 is detected by the projection area detector 3. Thereby, the image displayed in the overlap area 8 is controlled.

In addition, the projection area controller 4 inputs the video input signals 11 and 12 to the projectors 1 and 2, respectively, the signals 11 and 12 being area-controlled such that black display is performed in an area corresponding to the overlap area 8 in the video input signals 9 and 10. Black is not necessarily required in the present invention. Other colors, for instance, dark blue or full white may be employed.

Performing the black display in this embodiment substantially means that image projection (display) is not performed.

Further, although the description was made of the case where the black display was performed or the image projection was not performed in the overlap area 8, the present invention is not limited thereto. For instance, the black display may be performed or the image projection may be not performed in a part of the overlap area 8.

As described above, according to this embodiment, it is possible to prevent the image from being hard to recognize even though projected images are overlapped with each other and to control display of the projected image in accordance with a user's intention.

Although the description was made of a multi-projection system including two projectors in the above-described embodiment, the number of the projectors in the present invention is not limited thereto.

Figure 4:
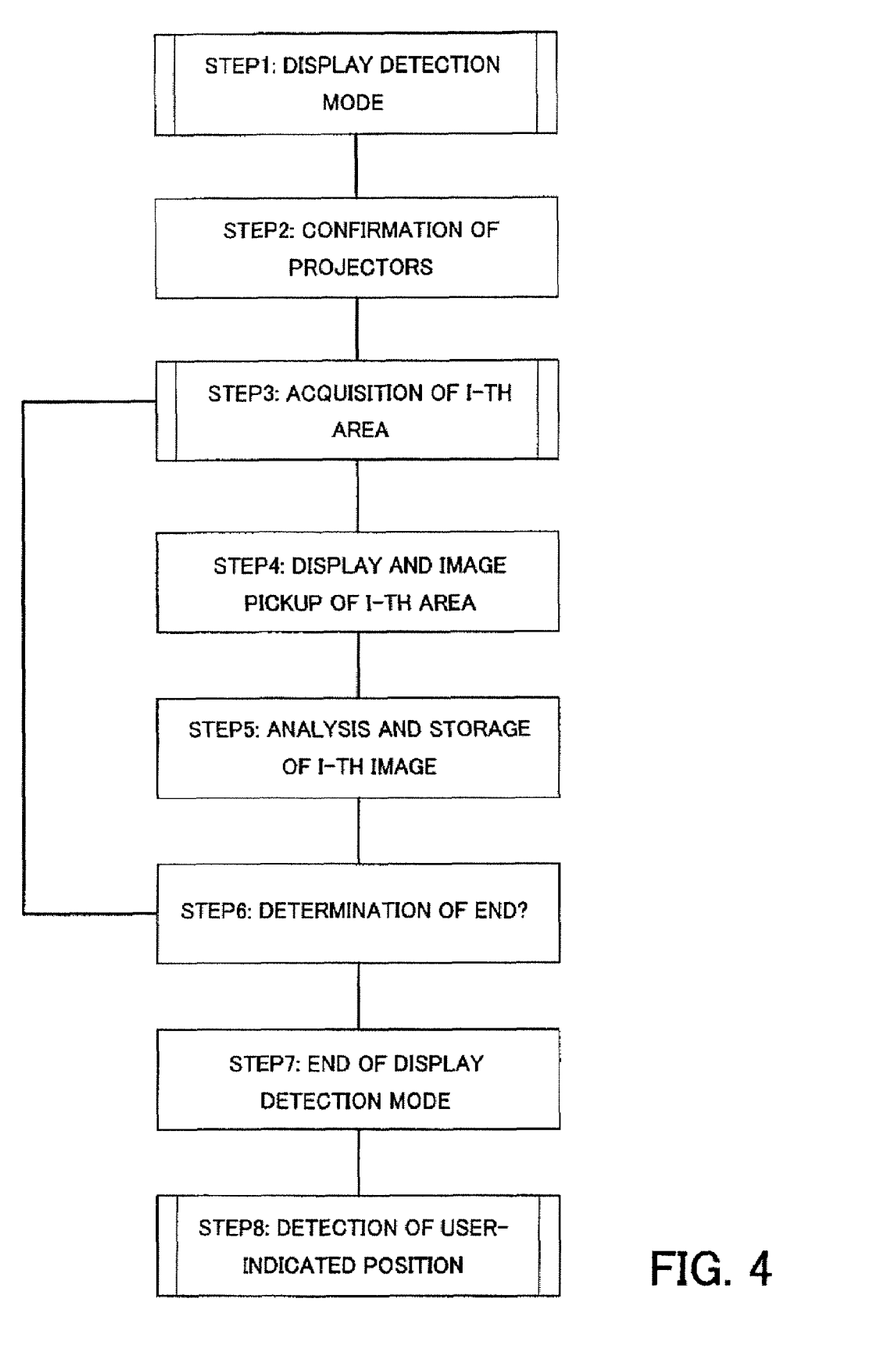
FIG. 4 is a flowchart showing the sequence in Embodiment 1.

FIG. 4 shows an example of the sequence to control the image projection area in a case where i (i≧2) projectors are used.

STEP 1 (display detection mode) is a process to confirm the projection area. This step is carried out at the start of the system or every predetermined time period.

STEP 2 (confirmation of the projectors) is a process to detect how many projectors are connected to the system. The i projectors are detected in this step.

STEP 3 (acquisition of the i-th areas), STEP 4 (display and image pickup of the i-th area), STEP 5 (analysis and storage of the i-th area) and STEP 6 (determination of end) are processes to store the i areas sequentially detected by the projection area detector 3.

STEP 7 (end of the display detection mode) is a process to start the control by the projection area controller 4, based on the detection result of each area.

STEP 8 (detection of a user-indicated position) is a process to detect a position indicated by the area indicating means 40 shown in FIGS. 3A and 3B.

Although fully white display or fully black display was performed in the detection of the projection areas 6 and 7 in the above-described embodiment, the present invention is not limited thereto.

For instance, a grid chart and a frame maybe employed. In addition, for instance, a blue frame and a red frame may be respectively and concurrently displayed by the first and second projectors 1 and 2. In this case, picking up the color frame image by the projection area detector 3 makes it possible to acquire information on dimensions, position, shape and the like of each of the projection areas 6 and 7 simultaneously.

Furthermore, performing the area detection and control of the projection areas 6 and 7 during projection makes it possible to achieve a multi-projection system capable of responding increment/decrement of the overlap area 8 caused by movement of the projectors 1 and 2.

Although this embodiment showed the case where the projection area detector 3 and the projection area controller 4 were separated from each other, they may be configured integrally. Further, the projectors 1 and 2 may have functions of the detector 3 and controller 4.

Embodiment 2

Figure 5:
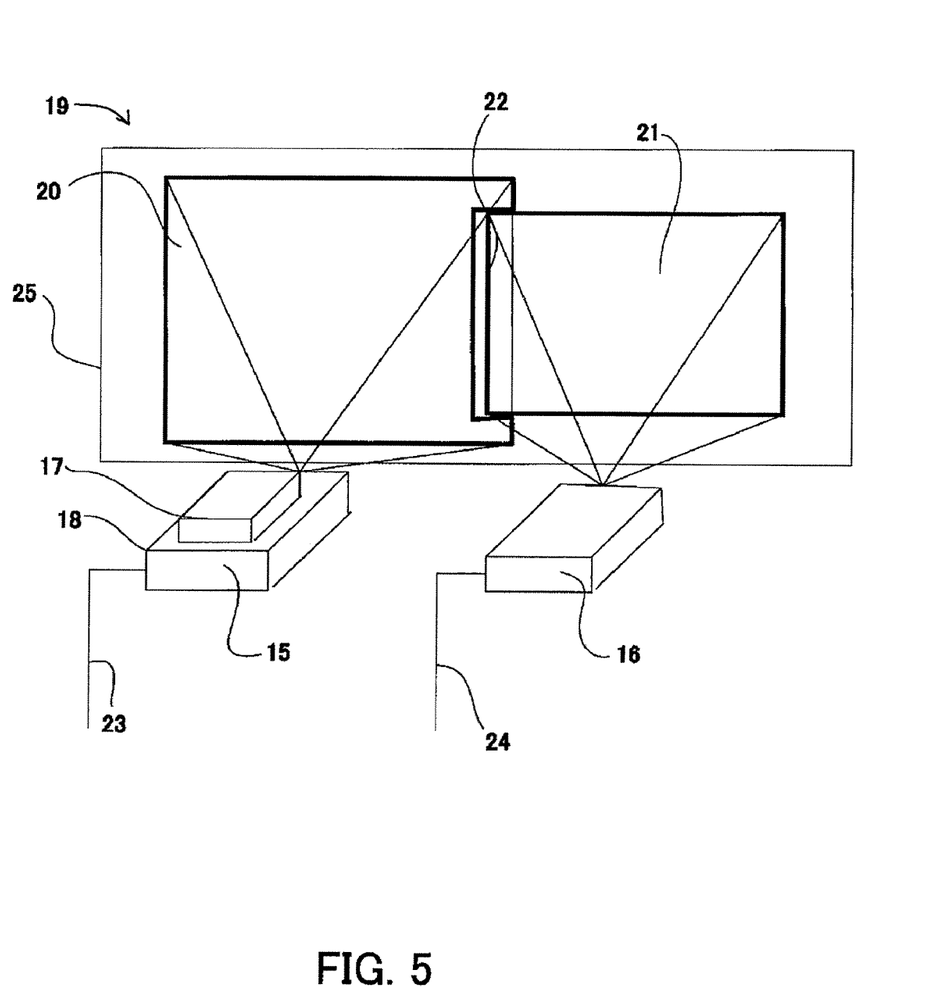
FIG. 5 is an outline view showing the configuration of the multi-projection system that is Embodiment 2 of the present invention.

FIG. 5 is an outline view showing the configuration of the multi-projection system that is Embodiment 2 of the present invention. In FIG. 5, first and second projectors 15 and 16 respectively project images onto projection areas 20 and 21 on a screen 19.

Video signals 23 and 24 are input to the projectors 15 and 16, respectively. A projection area detector 17 detects information on an image 20 projected in a predetermined detection area 25 on the screen 19 by the first projector 15.

A projection area controller 18 is built in the main body of the first projector 15 and inputs a video signal generated by adding area-control to the video input signal 23 based on the detection result by the projection area detector 17. The projector 15 displays the image on the screen 19, based on the video signal.

A video input signal is input to the second projector 16 as it is, in other words, without control of the projection area.

The projection areas 20 and 21 corresponding to the projectors 15 and 16 form an overlap area 22, as shown in FIG. 5. Therefore, when the projectors 15 and 16 project the images based on the video input signals 23 and 24 as they are onto the screen 19, the images in the overlap area 22 become hard to recognize.

Figure 6A:
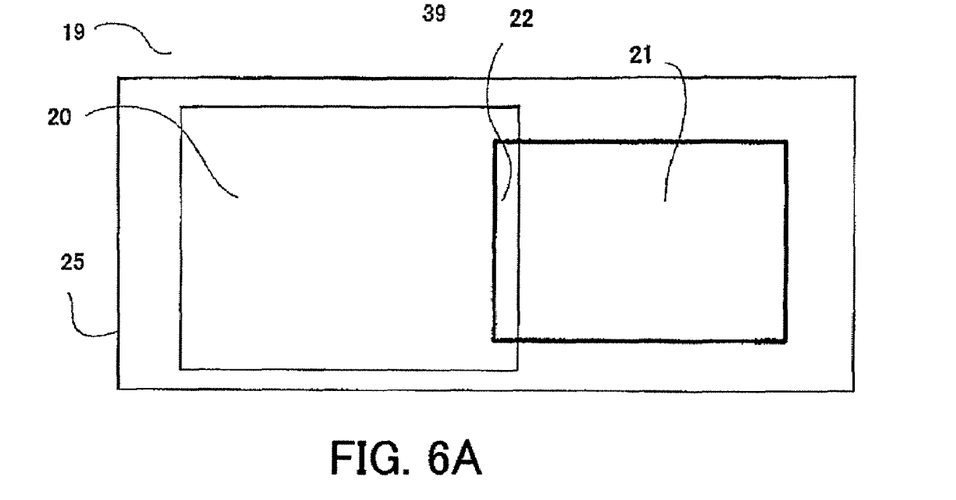
FIGS. 6A and 6B are schematic views of projection images in FIG. 5.
Figure 6B:
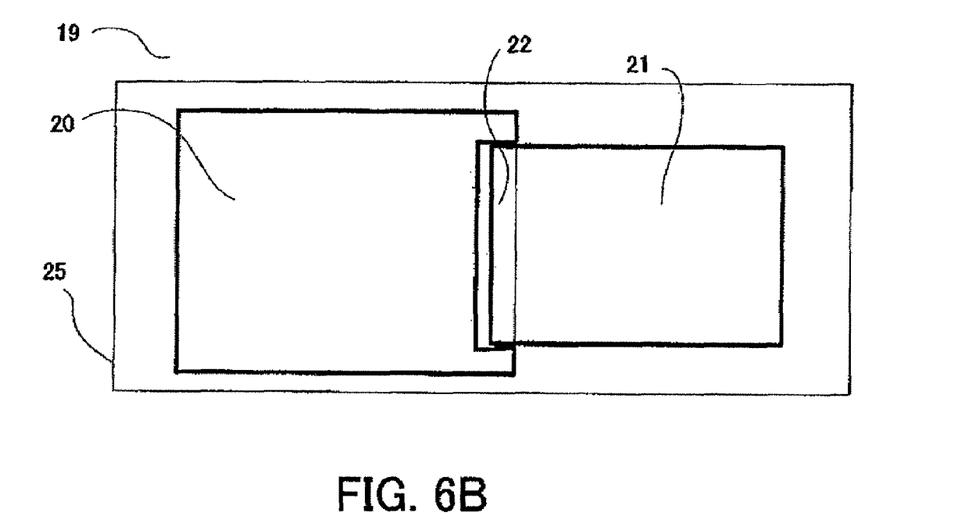

The specific method for detecting the projection areas 20 and 21 and controlling thereof will hereinafter be described. FIGS. 6A and 6B schematically show the relationship between the detection area 25 and the projection areas 20 and 21 on the screen 19.

The projection areas 20 and 21 form the overlap area 22. First, as shown in FIG. 6A, the first projector 15 displays a fully black image on the screen 19 based on the signals from the projection area controller 18 (not shown in FIG. 6A).

In this state, the projection area detector 17 detects the projection area 21 other than that of the first projector 15. The projection area detector 17 has a function to pick up a two-dimensional image. This makes it possible to recognize the projection area 21 of a projector other than the first projector 15, that is, the second projector 16.

Next, the first projector 15 displays a fully white image in the projection areas 20 and 21 on the screen 19. In this state, the projection area detector 17 picks up an image of the detection area 25 and then detects the projection area 20 of the first projector 15 from the difference between the picked-up fully black image and the picked-up fully white image.

Since the image in the projection area is controlled by only the first projector 15, the projection area controller 18 inputs the video input signal to the first projector 15, the video input signal being area-controlled based on the detection result by the projection area detector 17 such that black display is performed in the overlap area 22.

As a result, only the image projected by the second projector 16 is displayed in the overlap area 22 as shown in FIG. 6B.

Although this embodiment describes a case where one projector capable of controlling the projection area and another projector are included, the same effect can be obtained in a case where two or more other projectors are included.

Figure 7:
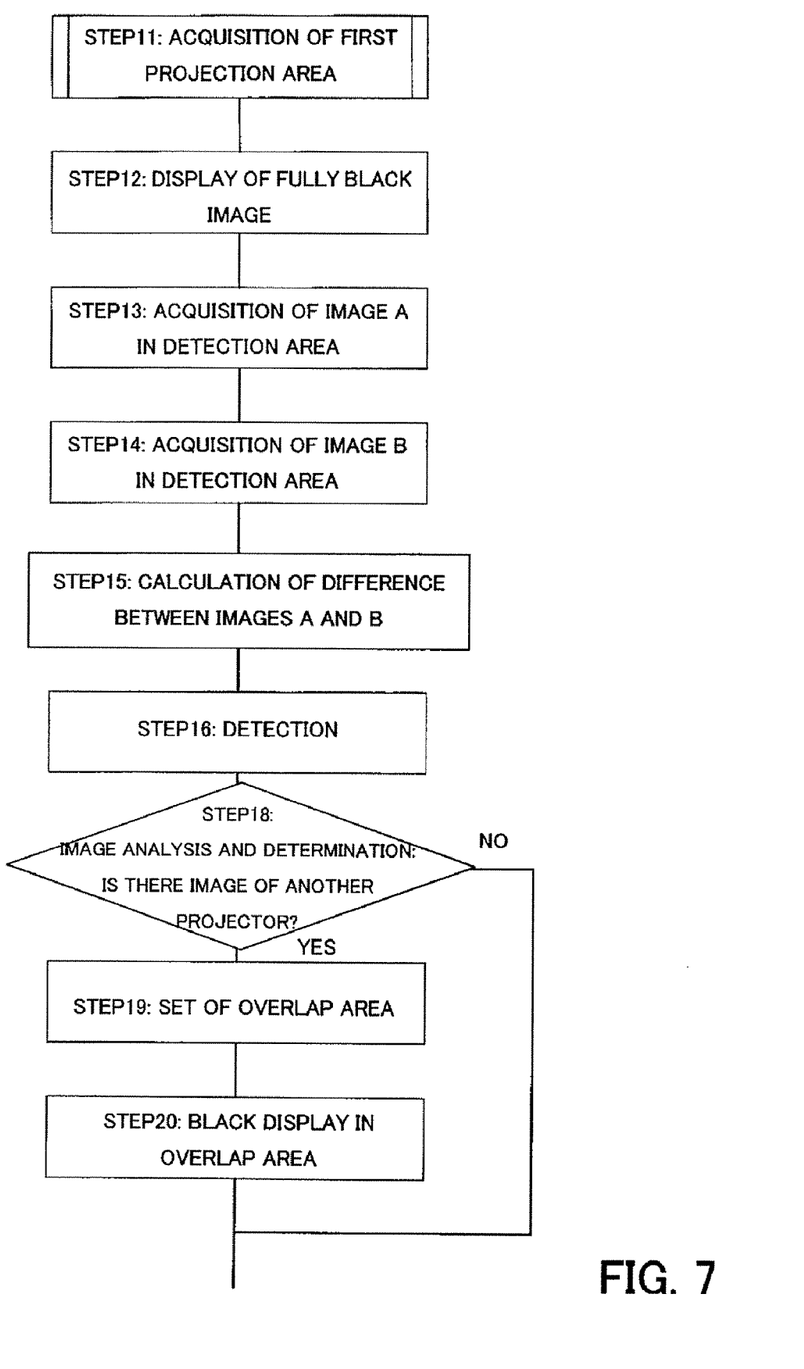
FIG. 7 is a flowchart showing the sequence in Embodiment 2.

FIG. 7 shows the sequence to control the image projection apparatus in this embodiment.

STEP 11 (acquisition of a first projection area) is a process to acquire the projection area 20 of the first projector 15.

STEP 12 (display of a fully black image) is a process to display the fully black image in the projection area 20.

STEP 13 (acquisition of the image A in the detection area) is a process to pick up the fully black image A projected by the first projector 15 in the detection area 25.

STEP 14 (acquisition of the image B in the detection area) is a process to pick up the fully white image B projected by the first projector 15 in the detection area 25.

STEP 15 (calculation of the difference between the images A and B) is a process to calculate the difference between the images A and B picked up at STEPs 13 and 14.

STEP 16 (detection) is a process to detect the projection area 20 of the first projector 15 based on the above-described difference and the overlap area 22.

STEP 18 (image analysis and determination) is a process to determine whether or not the image is projected by the other projector (that is, the second projector) in the detection area 25. If yes, the process proceeds to STEP 19. If no, the process ends.

STEP 19 (set of the overlap area) is a process to set the overlap area 22.

STEP 20 (black display in the overlap area) is a process to perform black display in the overlap area 22.

Although the projection area controller 18 in this embodiment displays the fully white and fully black images, the present invention is not limited thereto.

Figure 8A:
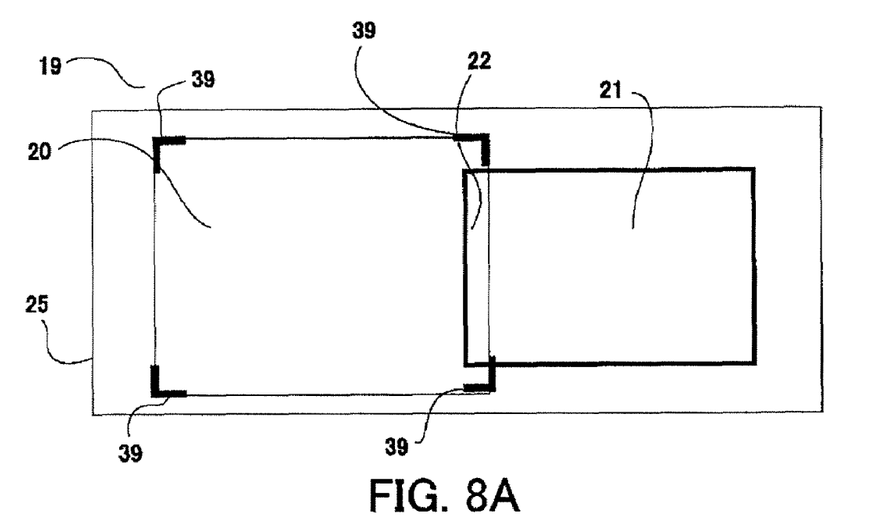
FIGS. 8A and 8B are schematic views of projection images in Embodiment 2.
Figure 8B:
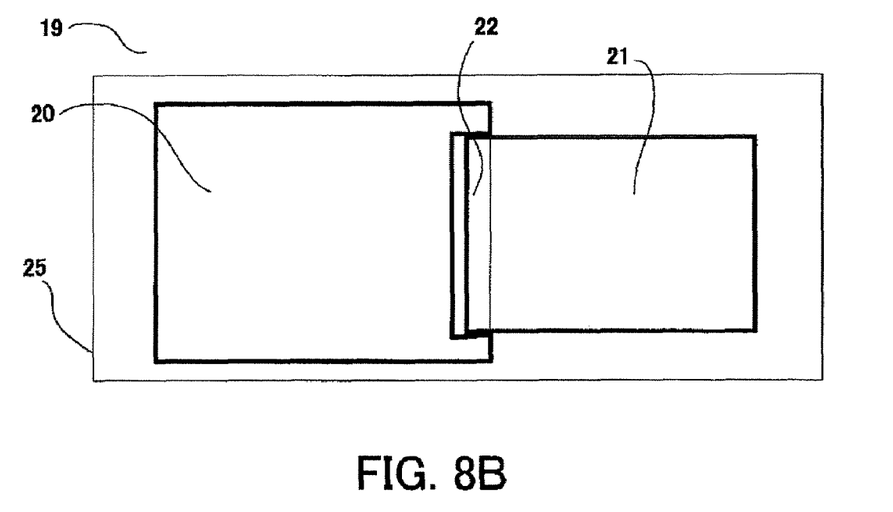
Figure 9:
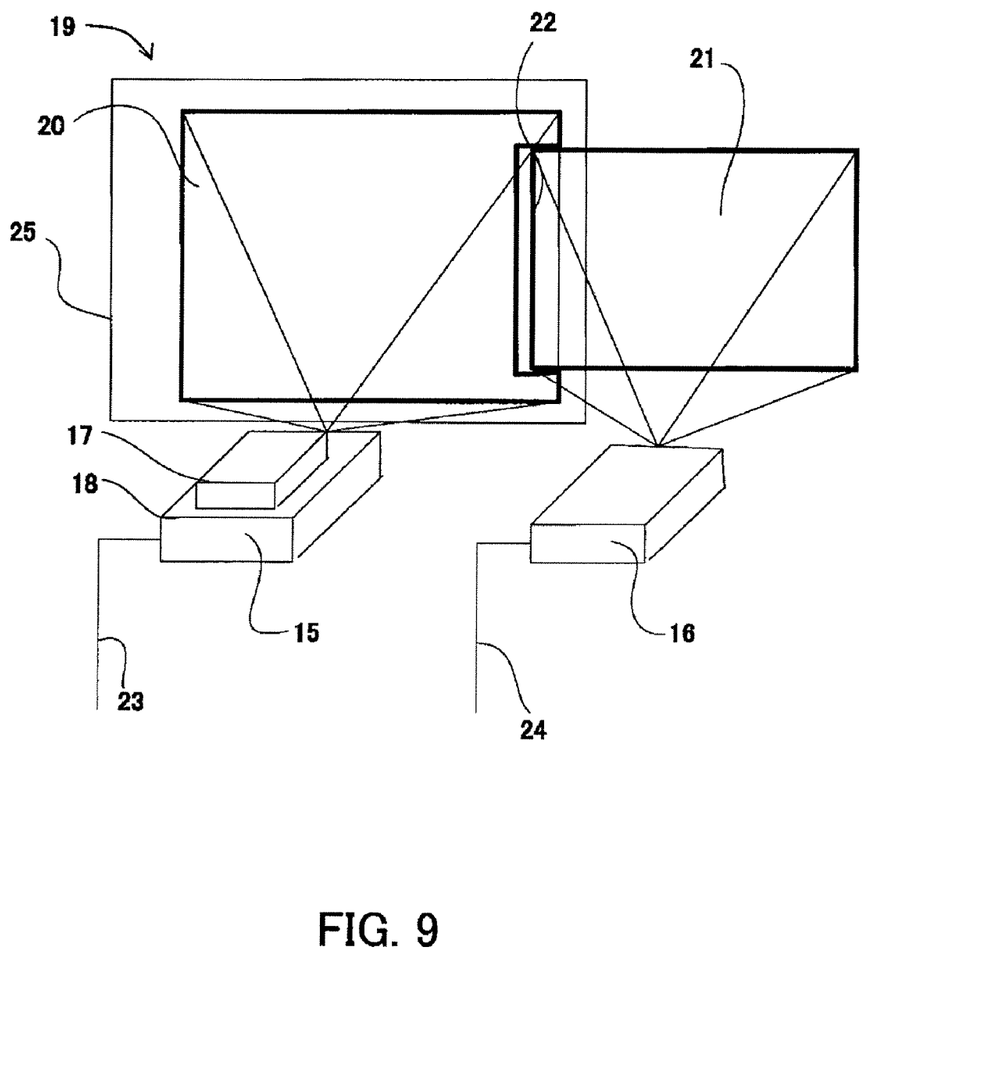
FIG. 9 is an explanatory figure showing another detection area of the projection area.

FIGS. 8A and 8B schematically show the projection areas 20 and 21 like FIGS. 6A and 6B. The projector 15 displays a predetermined frame 39 on the screen 19, instead of the fully black display.

The projection area detector 17 searches the position of the predetermined frame 39 and detects the projection area 20 of the first projector 15. Analyzing an image which is picked up together with the image in the projection area 20 of the first projector 15 makes it possible to acquire the projection area 21 of the second projector 16.

Although the description was made of the case where the detection area 25 included the projection areas 20 and 21 as shown in FIG. 5, the present invention is not limited thereto. If the detection area 25 includes at least the projection area 20 of the first projector 15, it is possible to obtain a similar effect.

According to this embodiment, even when the position of the second projector 16 is moved, performing detection and control of the projection area makes it possible to display an image that has no image overlapping and is easy to recognize.

Although this embodiment showed the case where the projection area detector 17 was separated from the projector 15, it may be built in the projector 15.

Further, both the projection area detector 17 and the projection area controller 18 may be separated from the projector 15.

Moreover, in this embodiment, the number of the projector may be one. In other words, the system may be constituted by, for example, only the projector 15.

Furthermore, the second projector 16 may be treated as an apparatus not included in the system, and the projection area controller 18 may control images projected by both the first and second projectors 15 and 16 when the second projector 16 projects the image.

In this case, this is not a multi-projection system but a projection image display apparatus.

Specifically, the projector 15 projects an image onto a projection surface 19. The projection area detector 17 detects a predetermined area in the projection surface 19. The projection area controller 18 controls the projection area 20 of the projector 15.

The projection area detector 17 detects the projection area 21 of the projector 16 in the predetermined area 25, the projector 16 being a projector other than the projector 15. The projection area controller 18 controls the projection area 20 projected by the projector 15, based on a signal from the projection area detector 17.

Embodiment 3

Figure 10:
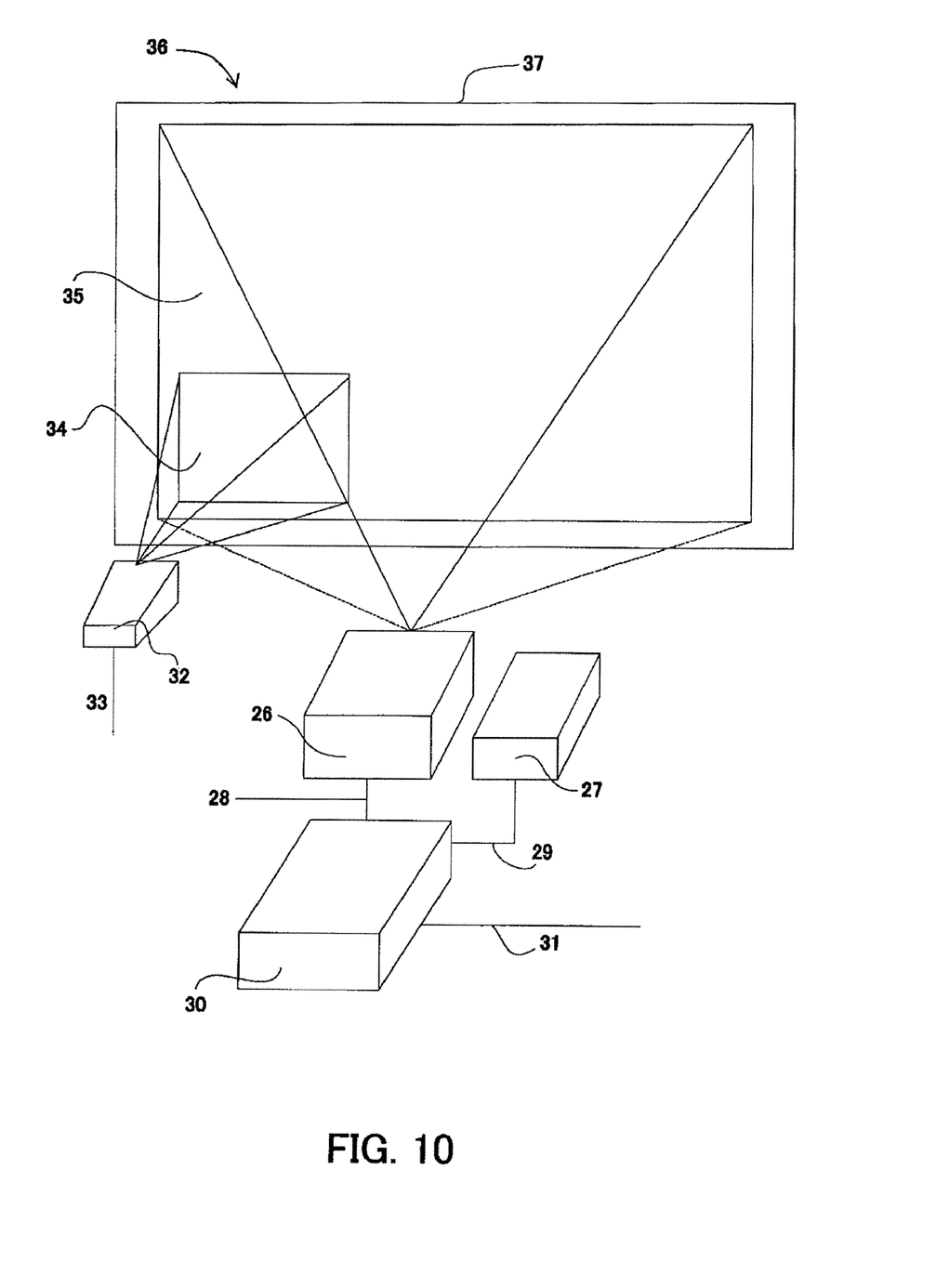
FIG. 10 is an outline view showing the configuration of the multi-projection system that is Embodiment 3 of the present invention.

FIG. 10 is an outline view showing the configuration of the multi-projection system that is Embodiment 3 of the present invention.

In FIG. 10, first and second projectors 26 and 32 respectively project images onto projection areas 35 and 34 on a screen 36.

The projector 26 is electrically connected to the projection area detector 27 and the projection area controller 30.

The projector 26 is a projector for a large screen, which projects a video image based on a video input signal 31 onto the screen 36.

On the other hand, the projector 32 is a small-sized portable projector which displays a video image based on a video input signal 33. The projection area 34 of the portable projector 32 is included in, in other words, completely overlapped with a projection area 35 of the projector 26.

A projection area detector 27 detects an image (projection area 35) in a detection area 37 on the screen 36. The projector 26 receives a video input signal 28 which is area-controlled based on the detection result by the projection area detector 27 and displays an image based on the video input signal 28.

Accordingly, the projection area controller 30 controls the projector 26 so that the image projected in the projection area 35 by the projector 26 does not overlap with the image of the projection area 34 of the portable projector 32.

Figure 11A:
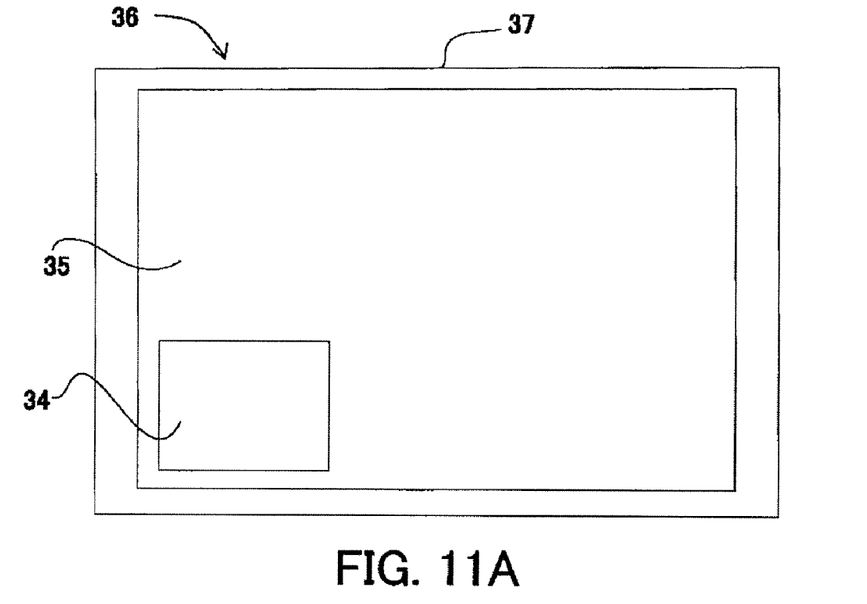
FIGS. 11A and 11B are schematic views of projection images in Embodiment 3.
Figure 11B:
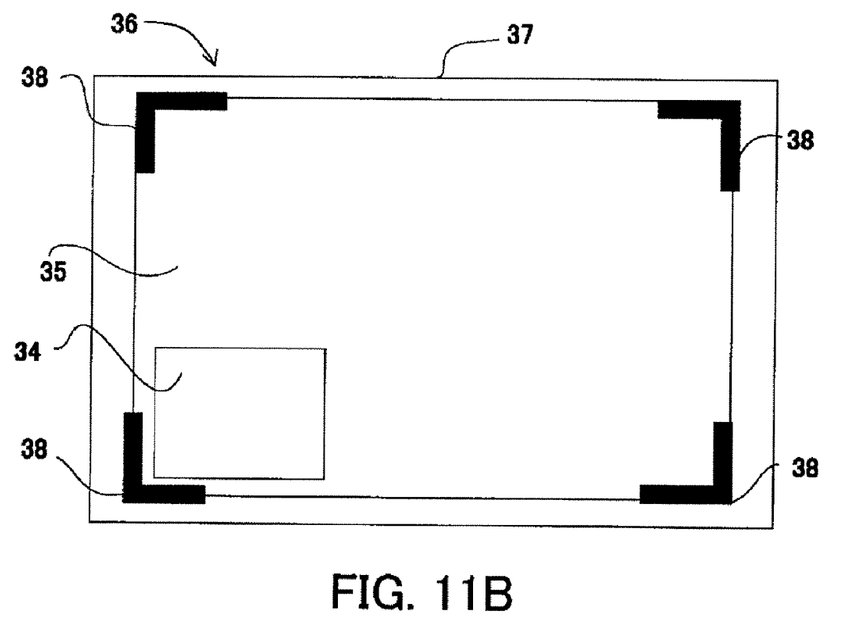

The method for this control will hereinafter be described. FIGS. 11A and 11B schematically show the projection areas 35, 34 and the detection area 37.

First, the projector 26 performs fully black display based on the video input signal 28 from the projection area controller 30 as shown in FIG. 11A.

The projection area detector 27 has a function to pick up a two-dimensional image, picking up the detection area 37 in the state in which the projector 26 outputs the fully black image 35.

At this point, the image in the projection area 34 of the portable projector 32 is picked up, thereby being confirmed what image exists in the detection area 37.

Next, the projection area controller 30 displays markers 38, which indicate four corners of the projection area 35 projected by the projector 26. The projection area detector 27 picks up the image in the detection area 37 in this state. Detecting the markers 38 from the picked-up image specifies the projection area 35 of the projector 26, as shown in FIG. 11B.

The projection area controller 30 causes the projector 26 to display a black image only in a part of the projection area 35 of the projector 26, the part corresponding to the projection area 34 of the portable projector 32. This prevents the image from being hard to recognize by image overlapping.

Although the projector connected to the projection area controller 30 displays the fully black image and the markers 38 sequentially when detecting the projection area of the other projector in the projection area 35 in this embodiment, the present invention is not limited thereto. The positions of the markers 38 and the position of the image projected by the other projector may be simultaneously acquired by image processing on the image including the markers 38 in the detection area 37. The shape of the markers 38 is not limited to that shown in the figure.

The detection by the projection area detector 27 and the control by the projection area controller 30 based on the detection result may be performed not only at the start of the system but also every predetermined time period. This makes it possible to prevent overlap of the projected images even when the position of the portable projector 34 is arbitrary changed.

Although the video input signals 31 and 28 are input through the signal lines in this embodiment, the signals may be input through various means such as wireless communication, and the format of the signals is arbitrary.

When the projection areas are overlapped with each other, a user of the system can select whether or not to prevent the image overlapping by the projection area controller 30 through an interface, not shown.

As described above, according to each of the embodiments, detecting the projection area of the projector makes it possible to facilitate detection of overlap of projected images. In addition, controlling the video input signal for the overlap area and inputting it to the projector make it possible to prevent overlap of images.

Moreover, the projection area detector detects the image projected by the projector other than one of first and second projectors in a predetermined area on the screen, and recognizes the image projected by the other projector in the projection area. Controlling the projection area of the one projector by the projection area controller based on the detection result makes it possible to prevent image overlapping.

In particular, it is possible to respond well to changes of the overlap area due to movements of the projector.

Further, when one of plural projectors which respectively project images based on plural video input signals is moved, image overlapping is generated, thereby making recognition of the images hard.

In contrast, the multi-projection system including plural projectors which were described in each of the embodiments can prevent the image overlapping that makes recognition of the images hard.

Furthermore, it is possible to achieve an arbitrary image space which is adaptable to changes of the projection area due to movements of the projector such as a portable projector.

Moreover, according to the above-described embodiments, it is possible to obtain a multi-projection system that can display easily-recognizable images even when the images are projected by plural projectors whose projection areas overlap with each other.

In addition, according to the above-described embodiments, it is possible to obtain a projection image display apparatus that display a predetermined image well even when an image projected by a single projector and an image projected by another projector overlap with each other.

Furthermore, the present invention is not limited to these preferred embodiments and various variations and modifications may be made without departing from the scope of the present invention.

This application claims foreign priority benefits based on Japanese Patent Application No. 2005-265867, filed on Sep. 13, 2005, which is hereby incorporated by reference herein in its entirety as if fully set forth herein.

What is claimed is:

1. A projection image display apparatus comprising: a projector which projects a first image onto a projection surface; a projection area detector that detects an overlap area in which at least a portion of the first image overlaps at least a portion of a second image provided on the projection surface and a projection area controller which controls projection of the first image by the projector, based on an input signal from the projection area detector; wherein the projection area controller controls the projector so as not to project the portion of the first image in the detected overlap area when the portion of the second image is provided in a detected overlap area.

2. A multi-projection system comprising: first and second projectors which respectively project corresponding first image and second images onto a projection surface; a projection area detector that detects an overlap area in which at least a portion of the first image will overlap at least a portion of the second image on the projection surface and a projection area controller which controls one of the first and second projectors, based on a detection result by the projection area detector, so as not to project the portion of an image corresponding thereto in the detected overlap area, while the portion of an image corresponding to another of the first and second projectors is projected in a detected overlap area.

3. The multi-projection system according to claim 2, wherein at least one of the first and second projectors is movable.

4. A projection image display apparatus comprising:
a first projector which projects a first image onto a projection surface;
a projection area detector which acquires a projection area onto which a second projector projects a second image in a certain area of the projection surface; and
a projection area controller which controls a projection area onto which the first projector projects the first image, based on an input signal from the projection area detector;
wherein the projection area controller controls the projection area of the first projector so that the first image is not projected onto an overlap area in which the first image projected by the first projector and the second image projected by the second projector are overlapped with each other.

5. The projection image display apparatus according to claim 4, wherein an area in which the first image projected by the first projector and the second image projected by the second projector are overlapped with each other is acquired by the projection area detector.

6. The projection image display apparatus according to claim 4, wherein an area onto which the second image is projected by the second projector is acquired by the projection area detector.

7. The projection image display apparatus according to claim 4, wherein, when an area that the first image projected by the first projector and the second image projected by the second projector are overlapped with each other is referred to as an overlap area, the projection area controller controls the projection area of the first projector so that the first image is projected onto only a part of the overlap area.

8. A multi-projection system comprising: first and second projectors which respectively project a first image and a second image on a projection surface; a projection area detector which acquires at least one of first and second projection areas onto which the first and second images are respectively projected by the first and second projectors; and a projection area controller which controls at least one of the first and second projection areas, based on a detection result by the projection area detector wherein the projection area controller controls the first projector so that the first image is not projected onto an overlap area in which the first image and the second image projected by the first projector and the second projector are overlapped with each other.

9. The multi-projection system according to claim 8, wherein at least one of the first and second projectors is movable.

10. A multi-projection system comprising: first and second projectors which respectively project a first image and a second image on a projection surface; a projection area detector which acquires an overlap area in which the first and second images respectively projected by the first and second projectors are overlapped with each other; a projection area controller which controls at least one of the first and second projection areas, based on a detection result by the projection area detector; and an area indicator which indicates one of the first and second projectors, wherein the projection area controller controls the first and second projectors so that a projector indicated by the area indicator projects an image on the overlap area and the projector not indicated by the area indicator does not project an image on the overlap area.

* * * * *

UNITED STATES PATENT AND TRADEMARK OFFICE
CERTIFICATE OF CORRECTION

PATENT NO. : 7,686,457 B2 Page 1 of 1
APPLICATION NO. : 11/531068
DATED : March 30, 2010
INVENTOR(S) : Shuichi Kobayashi et al.

It is certified that error appears in the above-identified patent and that said Letters Patent is hereby corrected as shown below:

Title page item [57] Abstract:

In line 8, CHANGE "firs"

TO READ -- first --

Signed and Sealed this

Thirteenth Day of July, 2010

David J. Kappos
*Director of the United States Patent and Trademark Office*